United States Patent [19]

Iwasaki et al.

[11] Patent Number: 4,841,391
[45] Date of Patent: Jun. 20, 1989

[54] ROTARY HEAD TYPE RECORDING AND/OR REPRODUCING APPARATUS HAVING MODE SELECTING MECHANISM

[75] Inventors: Akio Iwasaki; Kenichi Nagasawa, both of Kanagawa, Japan

[73] Assignee: Canon Kabushiki Kaisha, Tokyo, Japan

[21] Appl. No.: 88,126

[22] Filed: Aug. 21, 1987

[30] Foreign Application Priority Data

| Aug. 27, 1986 | [JP] | Japan | 61-200534 |
| Aug. 27, 1986 | [JP] | Japan | 61-200540 |
| Aug. 27, 1986 | [JP] | Japan | 61-200541 |
| Aug. 28, 1986 | [JP] | Japan | 61-202009 |
| Aug. 28, 1986 | [JP] | Japan | 61-202012 |
| Aug. 28, 1986 | [JP] | Japan | 61-202024 |

[51] Int. Cl.$^4$ .................. G11B 15/665; G11B 15/18
[52] U.S. Cl. ........................................ 360/85; 360/137
[58] Field of Search .................................. 360/85, 137

[56] References Cited

U.S. PATENT DOCUMENTS 4,562,496 12/1985 Saito et al. .......................... 360/85
4,642,712 2/1987 Kohda .................................. 360/85
4,661,864 4/1987 Kuwajima ......................... 360/85

Primary Examiner—Robert S. Tupper
Attorney, Agent, or Firm—Robin, Blecker & Daley

[57] ABSTRACT

A rotary head type recording and/or reproduction apparatus in which when to load with a tape-shaped recording medium convoluted on a pair of reels, the tensioned loop from one of the reels to the other is brought into a training engagement around a cylinder with a rotary head before signals are recorded or reproduced by the head, whereby in combination with a mode lever for determining the states of a plurality of mechanisms including those for loading the recording medium to train around the cylinder member and for transporting the recording medium past the head, use is made of a slide lever oriented perpendicularly to the mode lever and arranged to transmit the driving power of an electric motor to the mode lever therethrough.

14 Claims, 12 Drawing Sheets

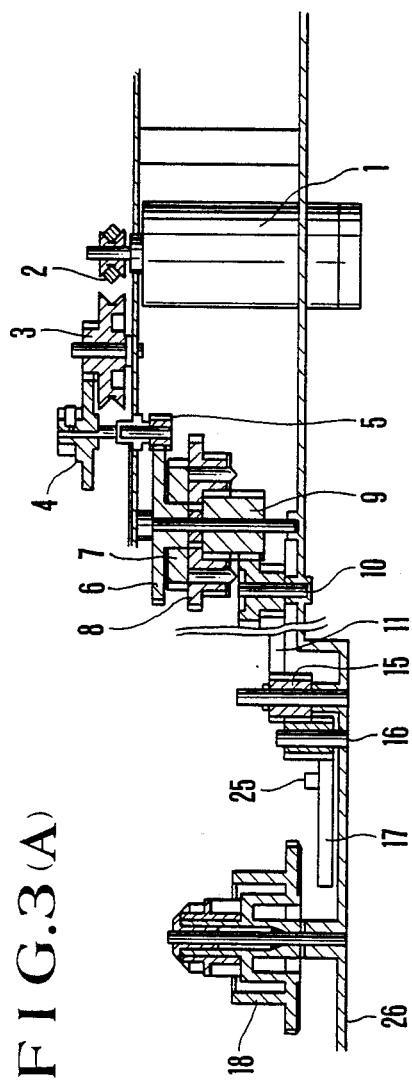
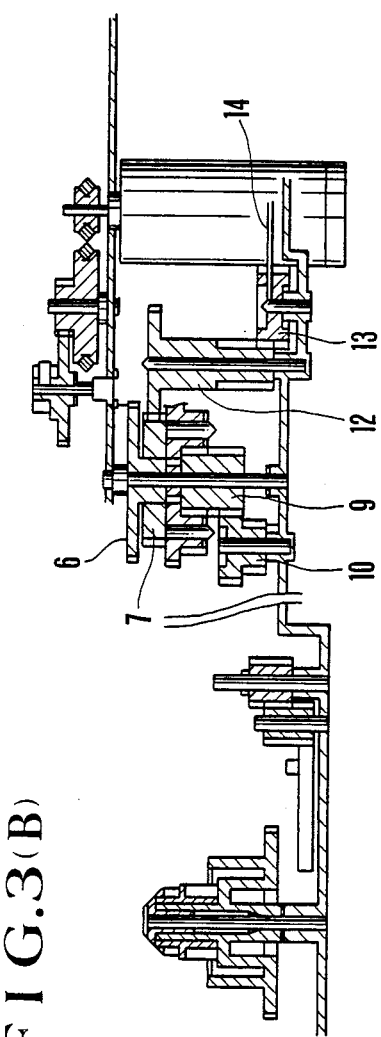
F I G. 3 (A)
F I G. 3 (B)

ROTARY HEAD TYPE RECORDING AND/OR REPRODUCING APPARATUS HAVING MODE SELECTING MECHANISM

BACKGROUND OF THE INVENTION

1. Field of the Invention

This invention relates to a rotary head-type recording or reproducing apparatus, and more particularly to apparatus of this type wherein a tape-shaped recording medium is supported on a pair of reels with an intervening loop of the medium formed and tensioned, and during loading of the medium, the loop is trained around a rotary head-equipped cylindrical member to permit the head to record signals on or reproduce signals from the medium.

2. Description of the Related Art

Discussion will now be had of a type of the above-noted recording or reproducing apparatus known as video tape recorders (VTRs).

FIG. 1 illustrates the general features of a VTR. A cassette 101 has a supply reel 102 and a take-up reel 103 contained within a housing. A magnetic tape 104 is convoluted on either or both of the reels 102 and 103. Before being introduced interiorly of the VTR, a portion 104 (shown by the dashed line in FIG. 1) of the tape within the cassette 101 and facing an open portion 101a thereof is in normal tension about a pair of guide pins 100a and 100b.

When the tape is introduced interiorly of the VTR, tape portion 104 is pulled out of the open portion 101a by means of moving guide posts 106, 107, 108 and 109 until its is trained around a cylinder 105 on the peripheral surface of which is a rotary head (not shown). The apparatus is accordingly readied for recording signals on or reproducing signals from the tape 104. At this time, the so-called "loading end" of the tape takes a disposition or path determined not only by the movable guide posts 106 to 109, but also by fixed guide posts 112, 113 and 114.

A loading ring 115 is supported so as to be rotatable along a guide member (not shown). Fixedly mounted on loading ring 115 are the movable guide posts 106, 107 and 108. A capstan 111 is pressed against a pinch roller 110 across the tape 104 when it is transported at normal speed along the aforesaid path. The pinch roller 110 is fixedly mounted on a lever 116 together with the movable guide post 109. In the course of loading, lever 116 is moved by a mechanism (not shown) from inside of the opening portion 101a to the position shown in FIG. 1.

In the described VTR, as the various modes, e.g., recording, reproducing, fast feed motion, cassette loading and tape setting, are selected and operated, each of the mechanisms experience state change. For example, the reels 102 and 103 change state between driving and braking. The capstan changes between driving state and idling state, i.e., in pressure against the pinch roller or not.

Although the selective setting of these modes can be effected freely by a user by pushing desired ones of operating keys, the coordination of all such mechanism need be controlled in a manner suited to the selected mode. For this purpose, the mechanisms may be provided with respective individual changeover members which are made electrically independent of one another to permit a system controller to control their operations. This method of coordination control is simple. But, the use of four or more electrical motors is required. One motor is needed for rotating the loading ring 115. A second is needed for driving the capstan 111. Third and fourth motors are needed for driving the two reels 102 and 103 independently of each other. Further, electrically operated plungers are required for bring the pinch roller 110 into pressing contact on the capstan 111 and braking pads into frictional contact with the respective reels. The employment of the described method involves a large size for the VTR. Besides the above-noted parts, there are many others which have to change their operative positions, as the VTR is switched from one mode to another. If mechanisms are provided for driving these parts and arranged to operate independently of one another and of the above-noted parts, the space they occupy is necessarily increased and production costs are increased.

Accordingly, the method of controlling the coordination of the above-noted variety of parts by means of electrically independent changeover members cannot be employed in VTRs wherein compact form and lightness in weight are of cardinal importance.

The most significant subject, in mechanical coordination control of the above-noted VTR components, is the accuracy of the changeover timing. In recent years, the art has seen the coordination control means constructed in the form of a lever with a layer number of camming surfaces and arranged to permit mechanical changing of the operative positions of the VTR components, depending on the selected mode, namely, control means hereinafter referred to as the "mode" lever.

In a VTR using the mode lever, a requisite is that the distances from the mode lever to all mechanisms to be coordinated be minimized. This implicitly requires that the mode lever should stand central to the multiplicity of such mechanisms. Further, an electric motor for driving the mode lever should be positioned adjacent the mode lever and known arrangements align the various mechanisms and their drive sources longitudinally of the mode lever with attendant difficulty in reducing the size of the VTR longtudinally of the mode lever.

Consideration may be given to a division of the mode lever into plural mode levers arranged to cooperate with each other with advantage in that the plurality of mechanisms are dispersed into cooperation with the respective plural mode levers. Because the two groups of the mechanisms are controlled by the respective plural mode levers, it becomes difficult to accurately control coordination between the diverse mechanism groups. The plural mode lever arrangement would detract from the significance of performance of the single mode lever arrangement.

Another consideration may be the non-use of a separate electric motor for driving the mode lever and the common use of a motor for driving both the mode lever and the loading ring 115.

However, for a common electric motor to drive the loading ring and the mode lever, demand arises for a mechanism for changing over the transmission of the driving torque of the motor between two paths and two latching mechanisms arranged to be selectively operated so that the one of the loading ring and the mode lever which is not to be driven is held stationary during the movement of the other, necessitating a complicated structure. Moreover, an additional mechanism is needed for controlling the operation such transmission changeover mechanism and selectively actuating the two latch mechanisms. Weight reduction of the VTR is accordingly not to be realized.

Another desire in the described VTR type of apparatus is to make the length and stroke of the mode lever as short as possible. However, where the mode lever is to be capable of bringing the pinch roller into pressure contact on the capstan, its stroke must be relatively long. In general, the fast tape-feed mode and the rewind mode are carried under the condition wherein the pinch roller is placed out of pressure contact with the capstan, while, in the record mode and the normal and various special reproduction modes, the applicable condition is that the pinch roller is pressed against the capstan in order that the capstan can regulate the speed of movement of the tape.

It has been difficult to reduce the stroke of the mode lever, since control coordination differs with different modes, and, since not only this difference, but the engagement and disengagement of the pinch roller are effected in the stroke of the mode lever. For this reason, in the conventional VTR, a limitation applies to the minimization of the length of the stroke of the mode lever.

As a cause of the such extension of the stroke of the mode lever, where the mode lever is used to change over the torque limiter between the engagement and disengagement dispositions, an idler driven by the capstan motor is removable from another idler which is drivingly connected to the reel through the torque limiter, and, after movement, is brought into engagement with still another idler, which is drivingly connected to the reel.

Another general feature of the VTRs of the character above is that the operation of the mode lever is performed during or after the tape loading. Even before the tape loading, however, there are many other mechanisms that change their operations.

For example, the ejection lever for the cassette holder is operated, and the reels in the cassette are released from the locking connection. Since, in the prior art, the operating mechanisms for these members were controlled by respective individual drive means, there is a limitation on reduction of the number of parts and of the size and weight of the apparatus.

SUMMARY OF THE INVENTION

The present invention has for its general object to provide a rotary head type recording or reproduction apparatus which can overcome at least one of the above-described problems.

A first object of the invention is to provide a rotary head type recording or reproduction apparatus with a mode lever for determining the states of a plurality of mechanisms making it possible to achieve an adequate reduction of the size of the apparatus in the longitudinal direction of the mode lever, and providing space for arrangement of each of the mechanisms.

Under such an object, according to the present invention, as an embodiment thereof, a rotary head type recording and/or reproducing apparatus is proposed comprising a cylinder member having a rotary head, a tape loading mechanism for bringing that part of a tape-shaped recording medium which is tensioned between a pair of reels into training engagement around the cylinder member, a transportation mechanism for transporting the tape-shaped recording medium, a mode lever slidable for determining the states of a plurality of mechanisms including the tape loading and transportation mechanisms, a driving power generating source and a slide lever movable in a direction to cross the mode lever by the driving power from the driving power generating source in order to transmit the driving power to the mode lever.

A second object of the invention is to provide a rotary head type recording or reproduction apparatus having one member given a function of latching a mode lever and a tape loading member and another function of changing over the driving power of a motor between transmissions to the mode lever and the loading member, thereby making it possible to realize simplification of the structure of the apparatus and minimization of the size and weight thereof.

Under such an object, according to the present invention, as an embodiment thereof, a rotary head type recording and/or reproducing apparatus is proposed, comprising a cylinder member equipped with a rotary head, a tape loading mechanism for bringing that part of a tape-shaped recording medium which is tensioned between a pair of reels into training engagement around the cylinder member, a transportation mechanism for transporting the tape-shaped recording medium, a mode lever slidable for determining the states of a plurality of mechanisms including the tape loading and transportation mechanisms, a driving power generating source, transmitting means for selectively transmitting the driving power produced from the driving power generating source to the tape loading mechanism and the mode lever depending on the magnitude of the load to be driven, and a changeover member for changing over the ratio of the magnitudes of the drive loads on the tape loading mechanism and the mode lever.

A third object of the invention is to provide a rotary head type recording or reproduction apparatus whose size can be reduced by reducing the slide stroke of a mode lever.

Under such an object, according to the present invention, as an embodiment thereof, a rotary head type recording and/or reproducing apparatus is proposed, comprising a cylinder member equipped with a rotary head, a tape loading mechanism for bringing that part of a tape-shaped recording medium which is tensioned between a pair of reels into training engagement around the cylinder member, a reel drive mechanism for driving the pair of reels, a tape drive mechanism for driving the tape-shaped recording medium not through the pair of reels, and a mode determining member for determining the states of a plurality of mechanisms including the tape loading, tape drive and reel drive mechanisms, the mode determining member being movable between a plurality of stop positions, and the plurality of stop positions including a first position in which the tape drive and reel drive mechanisms are operative, a second position in which the tape drive mechanism is inoperative but the reel drive mechanism is operative, and a third position lying in between the first and second positions and where the reel drive mechanism is inoperative.

Other objects of the invention than those described above and its features will become apparent from the detailed description of embodiments thereof by reference to the drawings:

BRIEF DESCRIPTION OF THE DRAWINGS

FIGS. 3(A) and 3(B) are sectional views of the transmission of the driving power of a motor 1 of FIG. 2.

DETAILED DESCRIPTION OF THE PREFERRED EMBODIMENTS

The present invention is next described in connection with an embodiment thereof as applied to a VTR.

Figure 2:
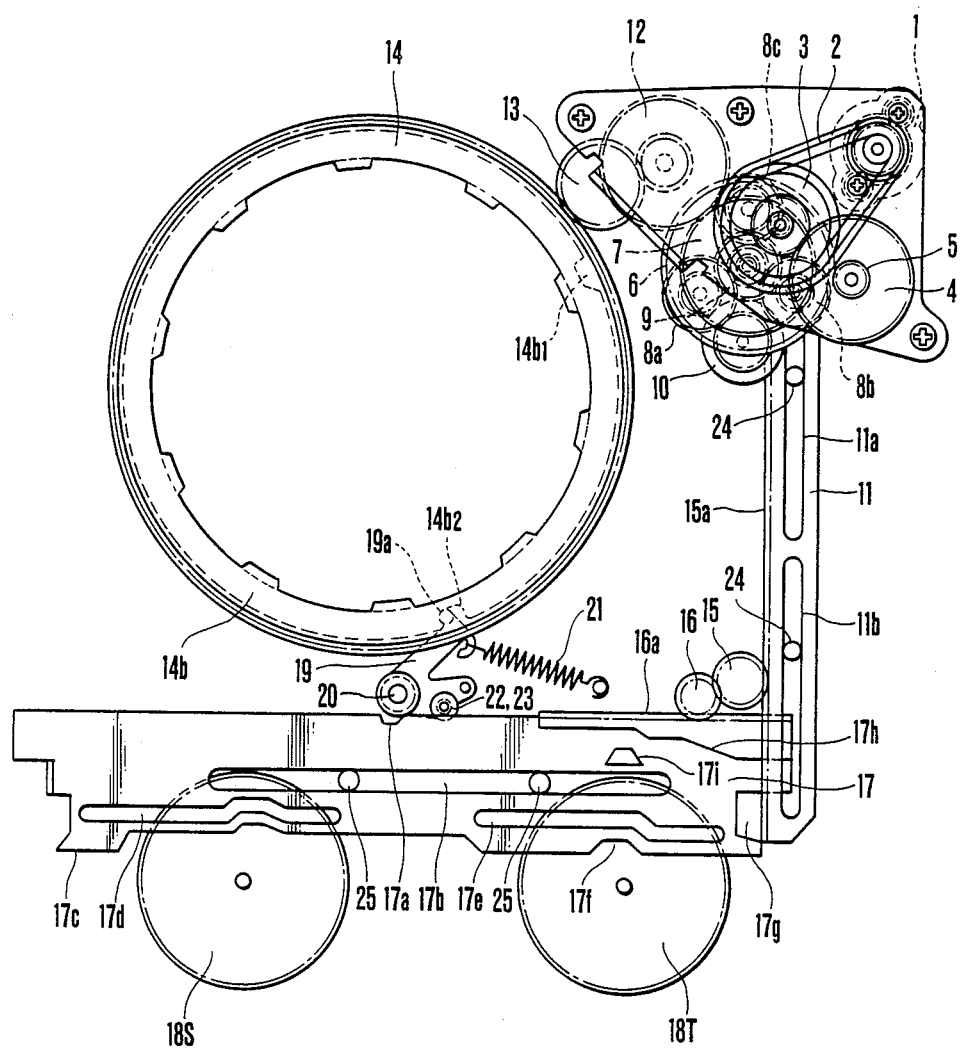
FIG. 2 is a plan view of an embodiment of a VTR according to the present invention with the drive mechanism for the loading ring and the mode lever shown in detail.

In FIG. 2, there is shown the VTR of the invention including a loading ring 14, a mode lever 17 and a drive mechanism therefor. This mechanism comprises an electric motor 1 whose driving power is transmitted through an endless belt 2 to a gear 3, a train of gears 3 to 10, 12, 13, 15 and 16 rotatably mounted on their respective shafts, a slide lever 11 in drive connection with the gear 10 to slide in its longitudinal direction and additional gears 15 and 16 by which the mode lever 17 is moved as the slide lever 11 moves. The loading ring 14 is rotated by the rotation of the gear 13. The VTR further includes a supply reel table 18S, a take-up reel table 18T, a lever 19 pivotally mounted about a pin 20 which is fixedly mounted on a framework and urged by a spring 21 to turn clockwise, a pin 22 on the lever 19, and a roller 23 rotatably mounted on the pin 22.

FIGS. 3(A) and 3(B) show how to transmit the driving power of the motor 1 selectively to the mode lever 17 and the loading ring 14 respectively. Using these figures, the transmitting mechanism for the driving power of the motor 1 is explained. The driving power of the motor 1 is first transmitted to the gear 3, and therefrom then transmitted through the gears 4 and 5 on a common shaft to the gear 6. The gears 6, 7, 8a, 8b, 8c and 9 constitute a planetary gear unit whose function is to supply the rotation of the gear 6 to either one of the gear 7 or 9. The rotation of this one gear 7 is transmitted through the gear 12 and 13 to the loading ring 14, while the rotation of the other gear 9 is transmitted through the gear 10, the slide lever 11 and the gears 15 and 16 to the mode lever 17. That is, this planetary gear unit functions to change over the transmission of the rotating power of the motor 1 between the loading ring 14 and the mode lever 17.

Now assuming that the loading ring 14 is held stationary so that the gear 7 shown in FIG. 3(A) cannot rotate, then rotation of the gear 6 causes rotation of the three gears 8a, 8b and 8c about the respective shafts on the gear 7 which in turn causes rotation of the gear 9. The rotation of the gear 9 is further transmitted to the gear 10. Because the gear 10 meshes with the rack 15a of the slide lever 11, the latter is drivingly moved. As shown in FIG. 2, the slide lever 11 has two longitudinally elongated slots 11a and 11b formed therein. Two pins 24 on a base plate 26 extend into the respective slots 11a and 11b so that the slide lever 11 slides in its longitudinal direction. Further, because the rack 15a of the lever 11 meshes with the gear 15, such movement of the slide lever 11 causes rotation of the gears 15 and 16. Because the gear 16 meshes with a rack 16a provided in one side edge of the mode lever 17, such rotation of the gear 16 drives the mode lever 17. The mode lever 17 has two longitudinally elongated slots 17b formed therein. These slots 17b are fitted on respective pins 25 planted on the base plate 26, so that the mode lever 17 slides in its longitudinal direction when the slide lever 11 moves.

Alternatively assuming that this mode lever 17 is held stationary so that, as is obvious from the foregoing explanation, the gears 9 and 10 shown in FIG. 3(B) cannot rotate, then rotation of the gear 6 causes the three gears 8a, 8b and 8c to revolve round the gear 9. In accompaniment with this, the gear 7 rotates. Because the gear 13 meshes with a gear cut on the outer periphery of the loading ring 14, such rotation of the gear 7 is transmitted through the gears 12 and 13 to the loading ring 14, causing rotation of the latter along a guide rail (not shown).

Figure 4:
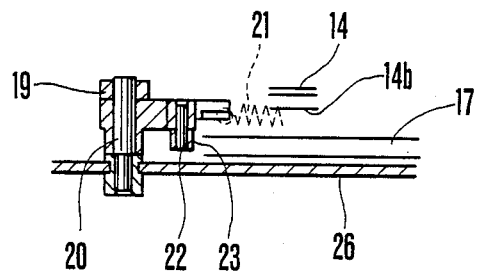
FIG. 4 is a sectional view illustrating the construction and arrangement of the changeover lever of FIG. 2.
Figure 5A:
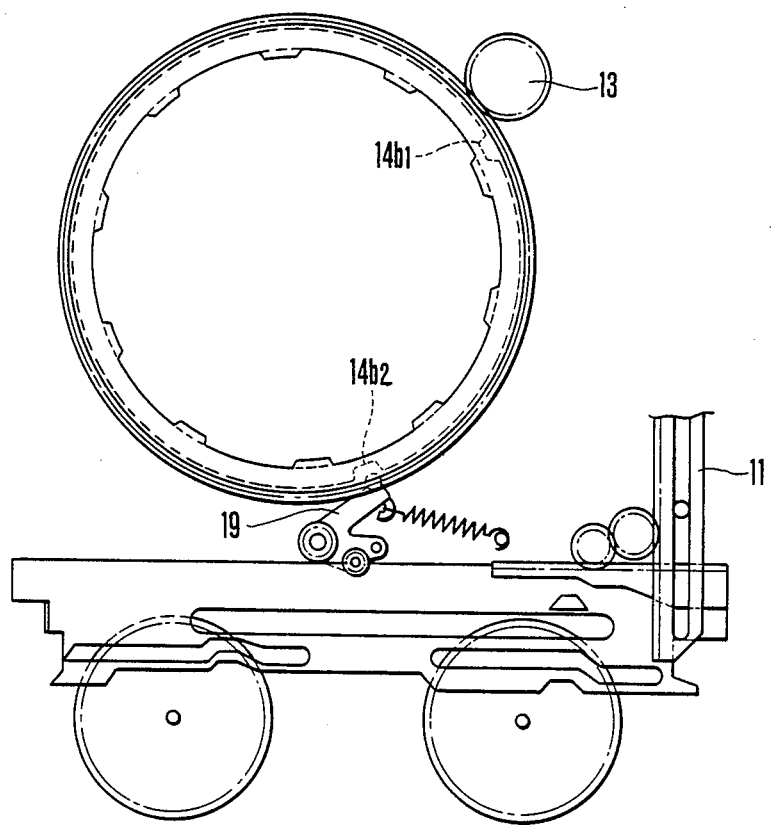
FIGS. 5(A) and 5(B) are plan views illustrating the relationship of the loading ring, mode lever and changeover lever of FIG. 2.
Figure 5B:
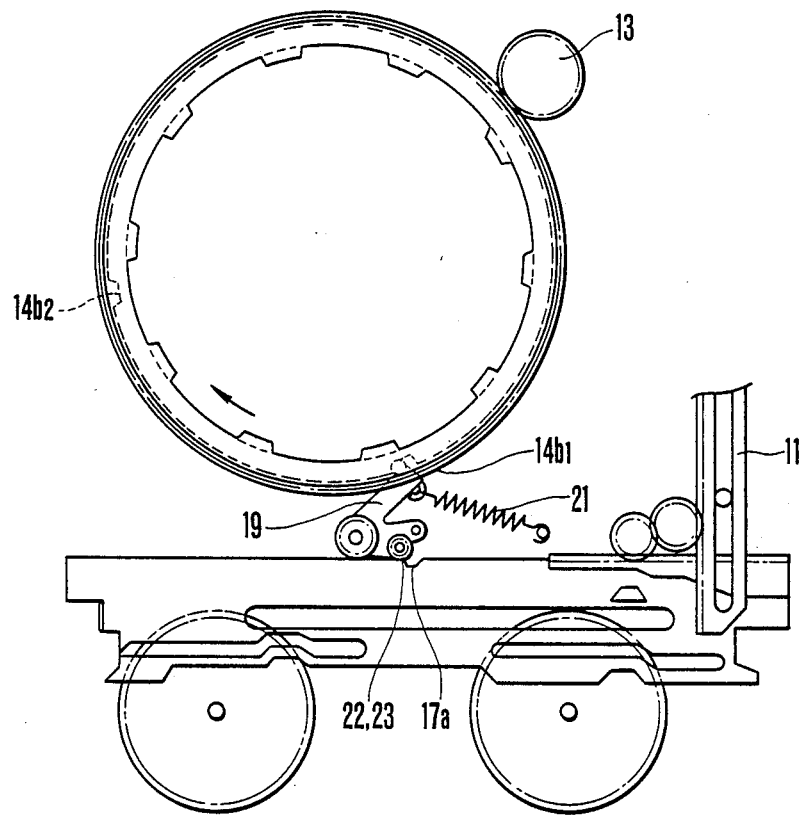

The lever 19 controls selection of either one of the mode lever 17 and the loading ring 14 to be driven by the driving power of the motor 1 (hereinafter called the "changeover" lever). The operation of this changeover lever 19 is described below. FIG. 4 in sectional view shows the construction and arrangement of the associated parts with the changeover lever 19. FIGS. 5(A) and 5(B) show the relationship of the loading ring 14 and the mode lever 17 with the changeover lever 19.

Figure 1:
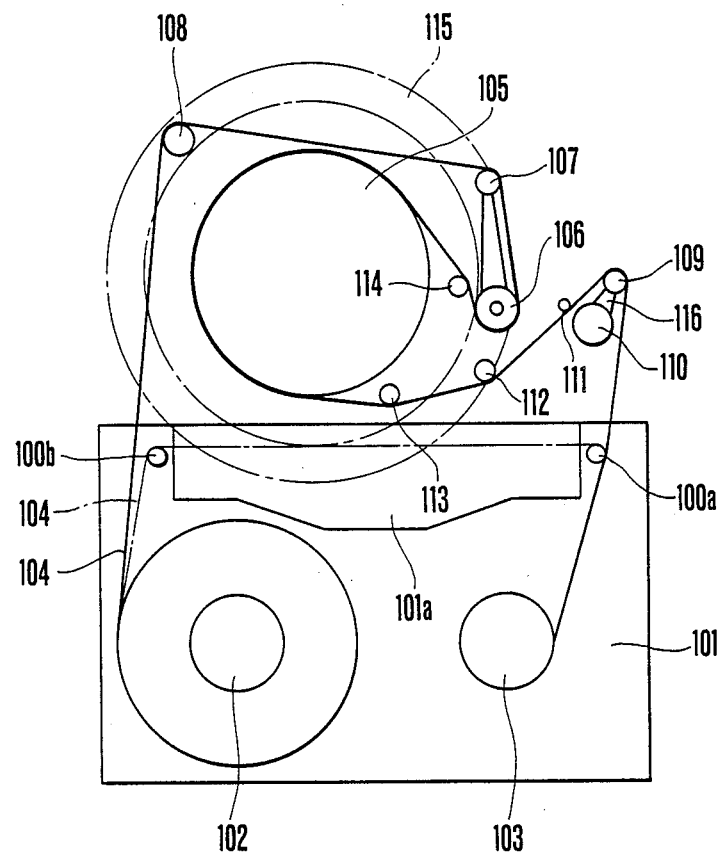
FIG. 1 is a schematic view of the construction of VTRs in general.

The loading ring 17 has movable guide posts (not shown), which are equivalent to, for example, those shown at 106 to 108 of FIG. 1. By rotating the loading ring 14 to the clockwise direction, the tape loading is carried out. In rotating it counterclockwise, the tape is released from the loaded position.

The mode lever 17 can take any of the various positions depending on the mode of the VTR as will be described later. The state shown in FIG. 5(A) corresponds to the mode during the tape loading, the state shown in FIG. 5(B) to the mode before the start of the tape loading, and the state shown in FIG. 2 to the mode after the completion of the tape loading.

Referring now to FIG. 5(B), in a state before the tape loading is carried out, a pin 19a (see FIG. 2) on one end of the changeover lever 19 rests in a recessed portion $14b_1$ of a cam $14b$ mounted as a unit on the loading ring 14. Since, in this state, the loading ring 14 is held stationary by the pin 19a engaging in the recessed portion $14b_1$, when the motor 1 rotates in the clockwise direction, the slide lever 11 slides upward as viewed in the figure. In accompaniment with this, the mode lever 17 slides to the left as viewed in the figure.

And, when a cam 17a of the mode lever 17 comes to vertically align with the pin 22 of the changeover lever 19, the pin 22 drops into a recessed portion of the cam 17a under the action of the spring 21. This causes the load on movement of the mode lever 17 to exceed that on rotation of the loading ring 14. Therefore, the above-described planetary gear unit is operated to render rotatable the loading ring 14. As the motor 1 further rotates in the clockwise direction, the loading ring 14 starts to rotate in the clockwise direction. Hence, a tape loading takes place.

The loading ring 14 moves from the state shown in FIG. 5(B) to the state shown in FIG. 5(A). When the tape loading is complete, the movable guide post on the loading ring 14 is latched by a catching member (not shown). Thereby, the loading ring 14 can no longer rotate from the state shown in FIG. 5(A), or the state in which the pin 19a faces a second recessed portion 14$b_2$ of the cam 14b. Here, the load on sliding movement of the mode lever 17, though large, is overcome by the driving power of the motor 1. When the motor 1 then rotates further in the clockwise direction, the pin 22 is pushed upward along a slant wall of the recessed portion of the cam 17a against the force of the spring 21. This causes the pin 19a to enter the recessed portion 14$b_2$. Thereupon, the state shown in FIG. 2 is assumed, where the mode lever 17 is able to slide in accompaniment with rotation of the motor 1. Hence, the mode lever 17 can take any of the corresponding positions to those of the modes which can be operated after the completion of the tape loading.

Conversely when the motor 1 rotates in the counterclockwise direction from the state shown in FIG. 2, the mode lever 17 moves to the right. And, when the mode lever 17 reaches the position shown in FIG. 5(A), the pin 22 drops into the cam 17a, thereby the loading ring 14 is rendered rotatable (in the counterclockwise direction). And, as the motor 1 further rotates in the counterclockwise direction, the loading ring 14 rotates in the counterclockwise direction, releasing the tape from the loaded position. And, when the rotation of the loading ring 14 advances until the pin 19a faces the first recessed portion 14$b_1$, the movable guide post on the loading ring 14 is latched by a mechanism (not shown). Thus, the unloading position is regained. Then, the motor 1 further rotates in the counterclockwise direction, causing the pin 22 to be pushed upward by the slant wall of the cam 17a to the state of FIG. 5(B). Hence, in the state shown in FIG. 5(B), the mode lever 17 is able to slide by rotating the motor 1. Even with the tape unloaded, the mode lever 17 can take a position corresponding position to the plurality of modes.

Figure 6:
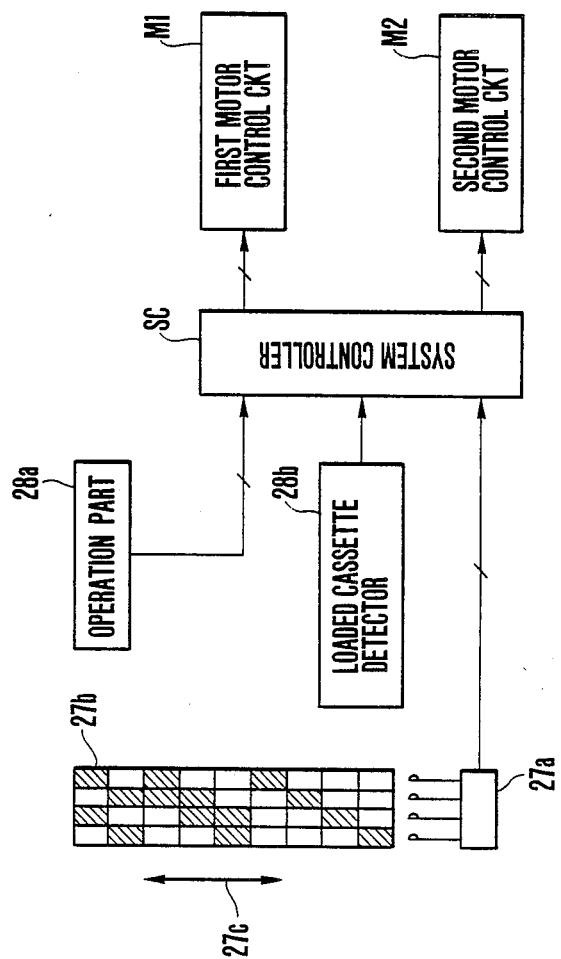
FIG. 6 is a block diagram of a circuit for controlling the motor in accordance with the position of the mode lever.

Next, the functions of the mode lever 17 and the positions this mode lever 17 can assume in this embodiment are explained. FIG. 6 is a block diagram illustrating how to control the motor in accordance with the position of the mode lever 17.

Formed in the mode lever 17 are various cams 17c, 17d, 17e, 17f, 17g, 17h and 17i. What task is performed by each cam will be described in detail later as rendered operative by the mode lever taking the plurality of positions. According to the VTR of this embodiment, the mode lever 17 has eight positions called, consecutively from the right of FIG. 2, an eject position, cassette-in position, take-up position, loading position, fast feed motion position, stop position, play position and reverse search position.

The eject position permits manipulation of an ejection lever of the cassette holder to take the cassette out of the chamber in the apparatus. The cassette-in position occurs just after the cassette has been loaded in the apparatus. The take-up position is set to run the tape under the condition that it is not loaded. The mode lever can assume these positions when the tape is unloaded.

The loading position occurs during tape loading or unloading. The other four positions are operative with the tape loading completed. The mode lever arrives at the fast feed position when the VTR performs fast feeding or rewinding of the tape, at the stop position when the VTR is stopping under the condition that the cassette is loaded, at the play position when the VTR performs one of the normal and special reproduction modes (including the forward high speed search one) except the reverse high speed search, and at the reverse search position when the VTR performs reverse searching at high speed.

In FIG. 6, four tracks of patterns 27b are formed on the mode lever 17, the hatched areas being electrically conductive. These tracks are read by respective four brushes 27a fixedly mounted on the framework 26 of the apparatus. A 4-bit binary information from the brushes 27a is supplied to a system controller SC. Each of the tracks of patterns 27b consists of nine compartments with their eight boundaries in correspondence to the above-described eight positions. The mode lever 17 moves in such directions that the patterns 27b move in direction indicated by arrows 27c. Hence, the system controller SC always is informed of the actual position of the mode lever 17.

A operation part 28a produces an output in the form of data representing the manually selected one of the record, reproduction, stop and eject modes, which is applied to the system controller SC. A detector 28b for the loaded cassette determines whether or not the cassette is loaded. Its data are supplied to the system controller SC.

Based on the data from the brushes 27a, the operation part 28a and the detector 28b, the system controller SC derives control data for first and second motor control circuits M1 and M2. The first motor control circuit M1 controls the aforesaid motor 1. The second motor control circuit M2 controls another motor for the capstan and reel. For example, when the cassette is inserted into the apparatus, the system controller SC responsive to the data from the loaded cassette detector 28b actuates the first motor control circuit M1 so that the mode lever 17 moves from the cassette-in position toward the stop position. Then, responsive to the output of the brushes 27a representing that the mode lever 17 has reached the stop position, the system controller SC deactuates the first motor control circuit M1. Then, responsive to a command for the reproduction mode from the operation part 28a, the system controller SC supplies data to the first motor control circuit M1 so that the mode lever 17 moved from the stop position until the play position, and also to the second motor control circuit M2 so that the tape 1 is transported at a prescribed speed.

Next, the functions of all the cams provided in the mode lever 17 are individually described.

Figure 7:
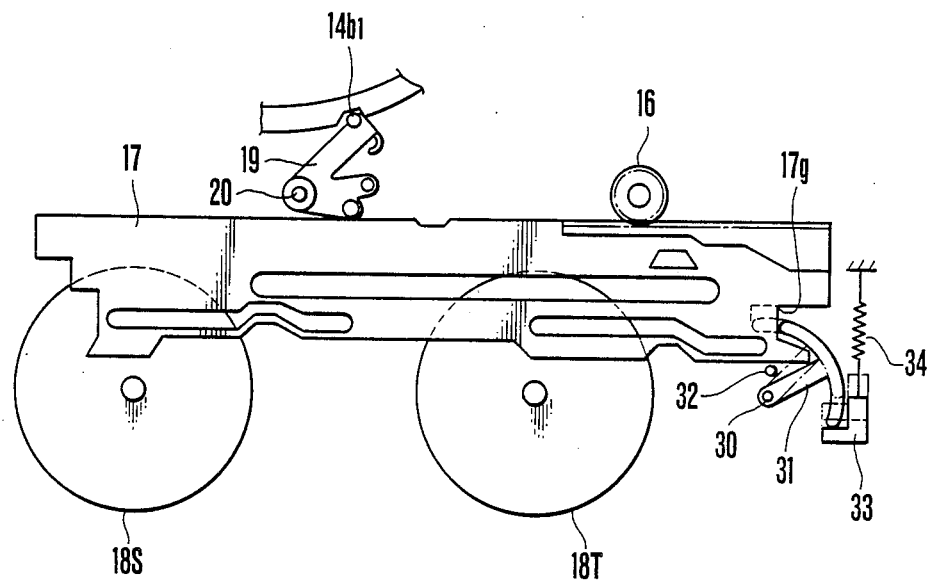
FIG. 7 is a top view taken to explain the function of an ejection control cam.

FIG. 7 illustrates an ejection control cam 17g. In the figure, the same parts as those in FIG. 2 are denoted by the same numeral characters. The illustrated position of FIG. 7 is the eject position of the mode lever 17. An ejection lever 33 constitutes part of a cassette holder mechanism (not shown), being urged upward by a spring 34. When the mode lever 17 arrives at the eject position from any other positions, the ejection control cam 17g pushes one end of a lever 31 of letter "T" shape. Therefore, the lever 31 is turned about a pivot pin 30 in a clockwise direction from the position shown by dashed lines to a position shown by solid lines, thereby the ejection lever 33 is pushed downward. Thus, the cassette holder performs ejection.

The eject command may be given by the operation part 28a in any mode of the VTR except the record one. By moving the mode lever 17 to the rightmost position, the aforesaid ejecting operation can be carried out. A stopper 32 limits the range of movement of the T-shaped lever 31 and the ejection lever 33 when the mode lever 17 lies outside the eject position.

Figure 8:
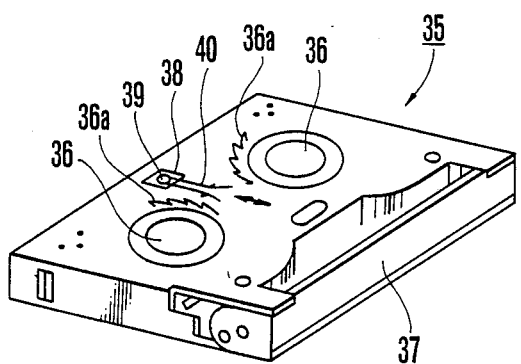
FIG. 8 is a perspective view of a cassette usable in the VTR of the invention.
Figure 9:
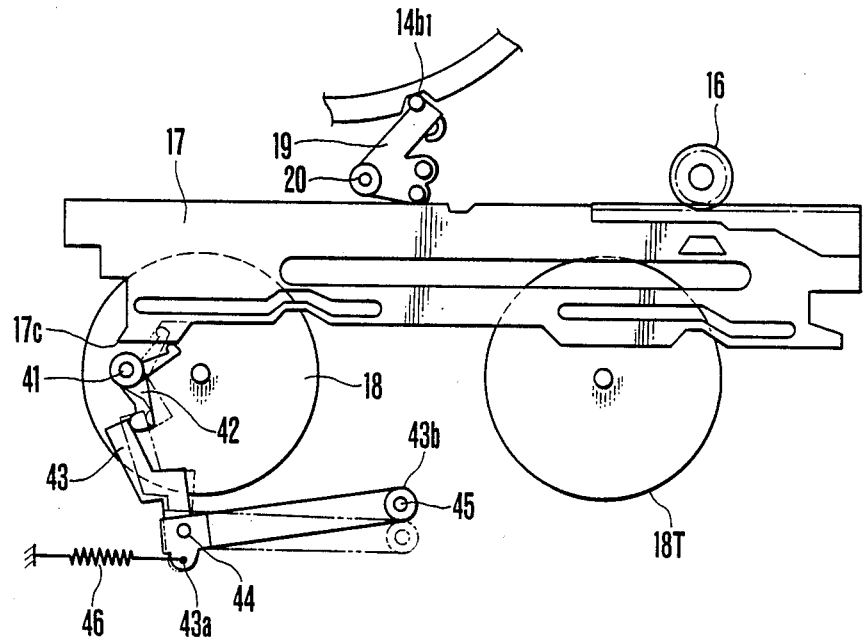
FIG. 9 is a top view taken to explain the function of a reel lock control cam.

Next, the function of a reel lock control cam 17c is explained about by using FIGS. 8 and 9. FIG. 8 illustrates the cassette usable in the VTR of this embodiment, and FIG. 9 illustrates how the reel lock control cam 17c operates.

In FIG. 8, the cassette 35 contains supply and take-up reels 36. A cover 37 protects the tape within the cassette 35. 38 is a hole into which a reel lock control pin to be described later is inserted. A reel lock control lever 39 cooperates with a pair of reel lock members 40. In the illustrated cassette, the two reel lock members 40, when engaged with respective gears 36a unified with the pair of reels 36, prohibit both reels from being rotated. And, when the reel lock control lever 39 is pushed upward as viewed in the figure, the reel lock members 40 also shift upward, whereby the reels 36 are released from the locking connection.

The illustrated position of the mode lever 17 in FIG. 9 is the cassette-in position. A lever 42 is rotatable about a pin 41 planted on the base plate 26. A reel lock release lever 43 is rotatable about a pin 44, and is urged to the counterclockwise direction by a spring 46 whose one end is connected to a hook 43a. In accompaniment with this, the lever 42 is urged to the clockwise direction.

When the mode lever 17 slidingly moves from the cassette-in position to the left as viewed in the figure, and reaches the take-up position, the levers 42 and 43 are turned to follow up the movement of the reel lock control cam 17c from the position shown by solid lines to a position shown by dashed lines. In accompaniment with this, the reel lock release pin planted on the end portion 43b of the reel lock release lever 43 moves upward as viewed in the figure, causing the reel lock control lever 39 of the cassette 35 to release the reels from the locking connection. As is obvious from the shape of the reel lock control cam 17c, this release of the reel locking is carried out in any of those of the positions which lie between the take-up position and the reverse search position to render rotatable the pair of reels 36.

Figure 10:
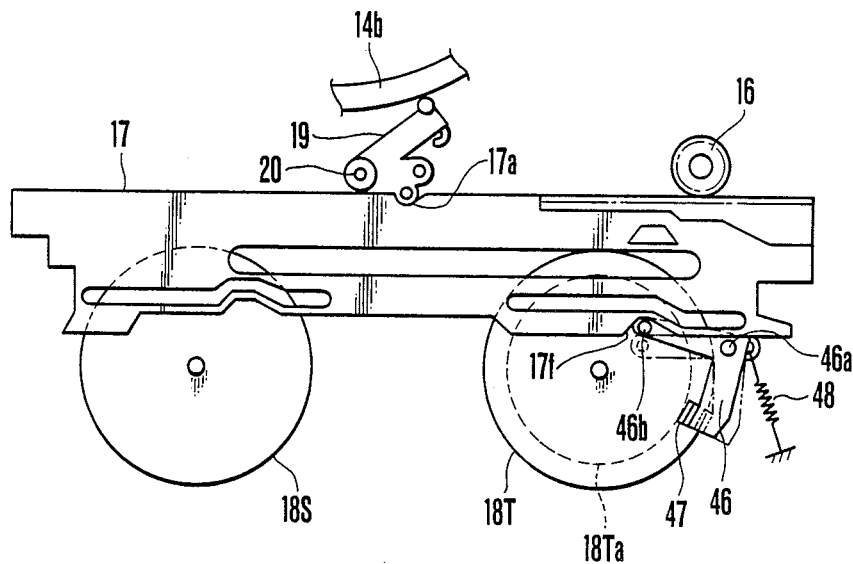
FIG. 10 is a top view taken to explain the function of a sub-brake control cam for the take-up reel.

Next, the function of a take-up side sub-brake control cam 17f is explained by using FIG. 10. A take-up side sub-brake pad 47 is mounted on one end of a lever 46 rotatably mounted on a pin 46a. A spring 48 whose one end is connected to a hooked portion of the lever 46 urges the latter in the clockwise direction. On the other end of the lever 46 is a pin 46b arranged to abut on the take-up side sub-brake control cam 17f. The illustrated position of the mode lever 17 in FIG. 10 is the loading one. Only when in this position, the pin 46b drops into a recessed portion of the cam 17f and the pad 47 is reacted to abut on a brake shoe 18Ta. Thereby, the take-up reel table 18T is hindered from rotation during the tape loading or unloading. Thus, despite the tape loading and unloading operation being recycled, the tape 4 is left unchanged in its longitudinal position. It is also to be noted that this take-up side sub-brake does not work with the help of the cam 17f when the mode lever 17 lies outside the loading position.

Figure 11:
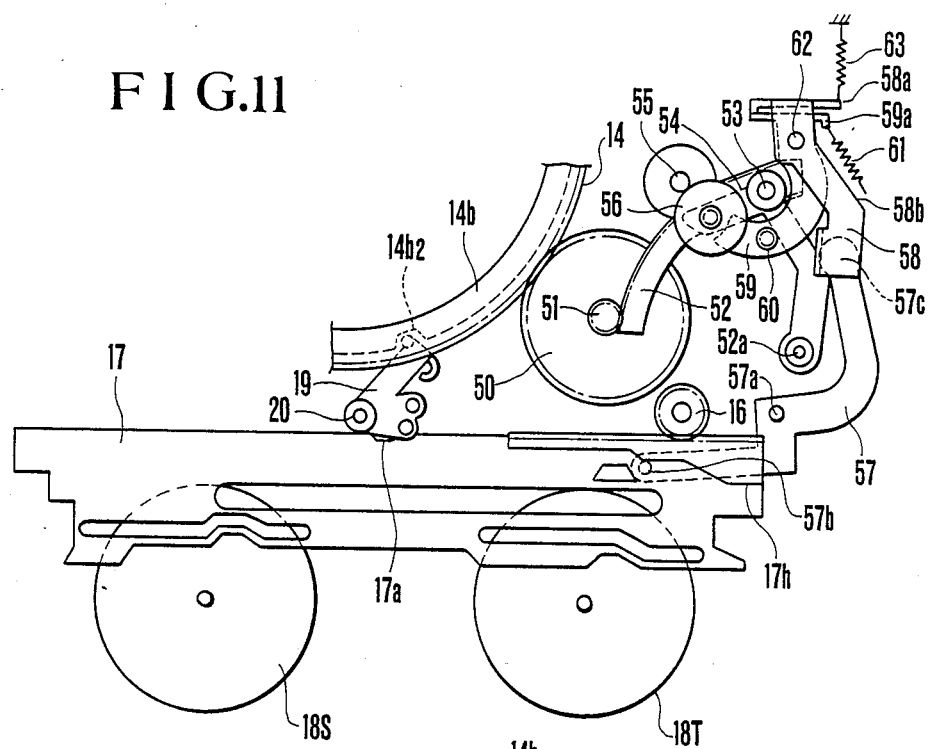
FIG. 11 is a top view taken to explain the function of a cam for controlling the pressing of the pinch roller.

FIG. 11 is taken to explain the function of a pinch roller control cam 17h. Before the explanation of this cam 17h, a mechanism for moving the pinch roller 56 is at first described. A gear 50 meshes with the gear formed in the outer periphery of the loading ring 14. Another gear 51 is concentrically unified with the gear 51, and meshes with a gear formed in the outer periphery of a lever 52 which is rotatable about a shaft 52a. When the loading ring 14 rotates in the clockwise direction so that the tape is brought by the movable posts on the ring 14 into training engagement round a cylinder member (not shown), the lever 52 turns in the clockwise direction to move the movable guide post 53 from the opening portion of the cassette to the illustrated position. Thus, the tape loading is complete. After that, when the mode lever 17 moves from the loading position further to the left, such a position as shown in the figure is taken. In FIG. 11, the mode lever 17 lies in the fast feed position.

Now it will be assumed that the magnetic tape (not shown) is arranged in between the capstan 55 and the pinch roller 56. The pinch roller 56 is rotatably mounted on the free end of a lever 54 which is rotatable about the movable guide post 53 and is urged in the counterclockwise direction. 57, 58 and 59 are pivotal levers respectively. The lever 57 is rotatable about a pin 57a, and the levers 58 and 59 are rotatable about a common pin 62. A spring 63 whose one end is connected to a hooked portion 58a of the lever 58 urges the latter in the counterclockwise direction and the lever 57 which cooperates with it in the clockwise direction. Another spring 61 which is connected between hooked portions 59a and 58b urges the lever 59 in the clockwise direction.

A pinch roller pressure contact control cam 17h in the form of a thickened portion provided on the mode lever 17 is arranged to turn the lever 27 in two stages. With the mode lever 17 on the right hand side of the loading position, the lever 57 assumes the most clockwise turned position, and the lever 59 is in the most counterclockwise turned position. When the mode lever 17 moves from this position to the fast feed position, the lever 57 is slightly turned to the counterclockwise direction by the cam 17h. In accompaniment with this, the lever 59 slightly turns to the clockwise direction. At this time, the free end of the lever 59 pushes the pinch roller shaft so that the pinch roller 56 comes close to the capstan 55. This is performed for the purposes of reducing the stroke of the mode lever 17 for the pressure contact of the pinch roller 56 however little it may be, and of shifting the tape path inward by the guide post 60 planted on the lever 59 so that, as the tape is fast transported, the tape is prevented from being damaged in touching the edge of the cassette openings. As the mode lever 17 further moves from this position to the left, when it reaches the play position, the lever 57 is further turned in the counterclockwise direction by the cam 17h, and the lever 59 also is further turned in the clockwise direction. Thereby, the pinch roller 56 is brought into pressure contact on the capstan 55. Of course, even in the case when the mode lever 17 is in the reverse search position, the pressure contact of the pinch roller 56 on the capstan 55 occurs.

Figure 12:
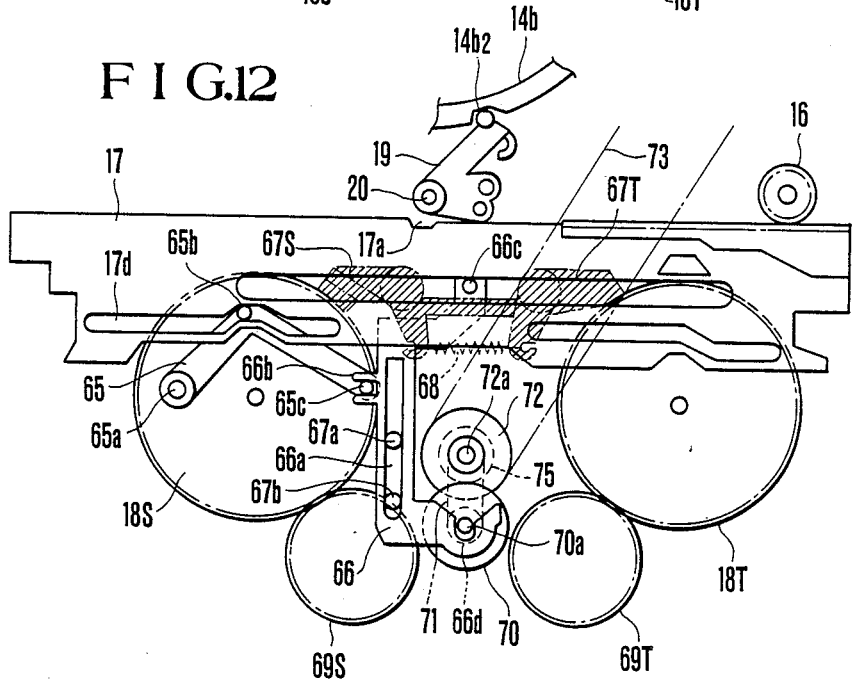
FIG. 12 is a top view taken to explain the function of a groove cam for controlling the main brake.

Next, using FIG. 12, the function of a main brake control slot cam 17d is explained. The slot cam 17d is provided through the wall of the mode lever 17. A pin 65b planted on a lever 65 fits in this slot cam 17d. The lever 65 is rotatable about a pin 65a. A pin 65c planted on the free end of the lever 65 fits in a recessed portion 66b of a shift lever 66. The shift lever 66 has a long slot 66a formed therein in which are fitted a pair of pins 67a and 67b planted on the base plate. This enables the shift lever 66 to shift vertically as viewed in the figure.

The illustrated position of FIG. 12 is the stop position of the mode lever 17. In this position as changed from any other positions, the lever 65 has turned in the counterclockwise direction. In accompaniment with this, the shift lever 66 has shifted upward as viewed in the figure. The pin 66c also has taken the upper position.

Supply side and take-up side main brake levers 67S and 67T are urged by a common spring 68 in a direction to press their brake pads on brake shoes of the reels 18S and 18T respectively. That is, the lever 67S is urged in the counterclockwise direction and the lever 67T in the clockwise direction. When the mode lever 17 is in any of the other positions than the stop position, the pin 66c pushes the inner edges of the brake levers 67S and 67T downward not to effect braking. But, when in the stop position, both brakes become effective as shown in the figure.

In FIG. 12, 73 is a belt which transmits the driving power from a capstan motor for driving the capstan 55. By this belt, a roller 72 is driven.

An idler 75 on a common shaft 72a of the roller 72 is in contact with another idler 70 which is rotatable about a shaft 70a. A lever 71 is rotatable about the shaft 72a, and carries the shaft 70a on its free end. These parts are so arranged that, without the shift lever 66, when the roller 72 is rotated in the clockwise direction by the driving belt 73, the lever 71 turns in the clockwise direction to bring the idler 70 into abutting engagement on the idler 69S. And, when the roller 72 is further rotated in the clockwise direction, its rotation is transmitted through the idlers 75 and 70 and further through the idler 69S to the supply reel table 18S, rotating the supply reel table 18S in the counterclockwise direction. Conversely when the roller 72 is rotated in the counterclockwise direction by the driving belt 73, the idler 70 is brought into abutting engagement on the idler 69T, rotating the take-up reel table 18T.

Now, for the stop position of the mode lever 17, the shift lever 66 is shifted upward so that its recessed portion 66d receives the shaft 70a of the idler 70. Thereby, rotation of the lever 71 is limited, causing the idler 70 to take a neutral position out of abutting engagement on either of the idlers 69S and 69T. The significance of such a feature of arranging the idler 70 in the neutral position is explained below.

In the VTR of this embodiment, in the case when the tape is fast fed or rewound, the only driving of the tape is to drive the reel directly. Meanwhile, when in the record or reproduction mode, the tape speed is determined by the capstan. Therefore, it is through a torque limiter (hereinafter abbreviated to "limiter") that the reel is driven. In this embodiment, this limiter is provided in each of the idlers 69S and 69T. For this purpose, the idlers 69S and 69T each are constructed in 2-layer structure with idlers 69Sa and 69Ta to drive directly and with idlers 69Sb and 69Tb to drive through the limiters. Therefore, the contacting position (height) of the idler 70 to the idlers 69S and 69T must be changed over between two values as the VTR is switched between the fast feed mode and one of the record and reproduction modes. During this time, there is need to once set the idler 70 apart from both the idlers 69S and 69T. From this reason, when the mode lever 17 is in between the fast feed and play positions, or at the stop position, the idler 70 is made to assume the aforesaid neutral position.

Figure 13A:
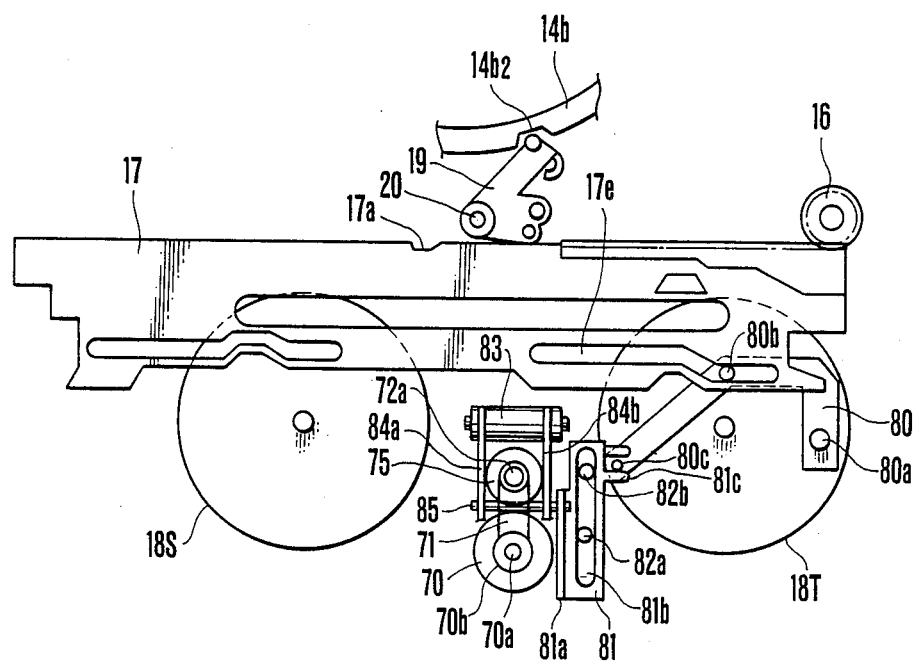
FIGS. 13(A) and 13(B) are top views taken to explain the function of a groove cam for controlling the height of an idler, and an idler height control mechanism.
Figure 13B:
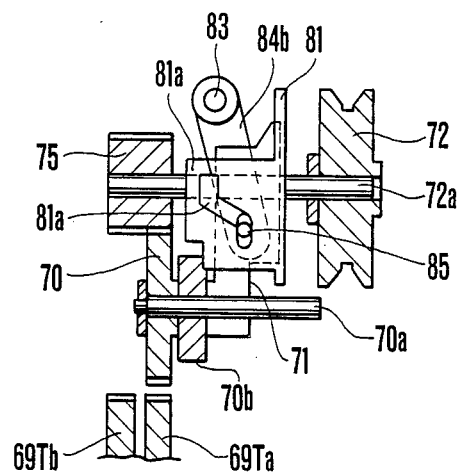

The aforesaid changing of the contact position of the idler 70 is controlled by means of a slot cam 17e. FIG. 13(A) is taken to explain the function of this idler height control cam 17e, and FIG. 13(B) in sectional view illustrates an idler height changeover mechanism. In FIGS. 13(A) and 13(B), the similar parts to those shown in FIG. 12 are denoted by the same numerals.

FIG. 13(A) illustrates a state when the mode lever 17 is in the play position. A lever 80 is rotatable about a pin 80a. A pin 80b on the lever 80 fits in the slot cam 17e. The lever 80 turns in the counterclockwise direction during the time when the mode lever 17 moves from the fast feed position to the play position. A shift member 81 has a long slot 81b in which fit pins 82a and 82b planted on the base plate and is shiftable vertically as viewed in the figure. A pin 80c planted on the lever 80 fits in a recessed portion 81c provided in the aforesaid shift member 81 so that rotation of the lever 80 causes shift of the shift member 81.

The shift member 81 has a guide plate 81a in which is formed a long slot 81d of such a shape as shown in FIG. 13(B). A pin 85 fits in this long slot 81d. The pin 85 is fixed to a lever 84a, 84b rotatable about a shaft member 83 and is pressure-inserted into the lever 71. When the shift member 81 shifts upward as viewed in the figure, as shown in FIG. 13(B), the lever 84a, 84b is turned in the counterclockwise direction as viewed in FIG. 13(B), and the lever 71 lifts the idler 70 upward. On the other hand, as shown in FIG. 13(A), when the shift member 81 shifts downward as viewed in the figure, the lever 84a, 84b is turned in the clockwise direction as viewed in FIG. 13(B), and the lever 71 pushes down the idler 70.

Therefore, when the mode lever 17 is on the left side of the play position, the shift member 81 is in a lower position as viewed in the figure, and the idler 70 is in a lower height position, its height corresponding to the idler 69Tb of FIG. 13(B). Meanwhile, when the mode lever 17 is on the right side of the fast feed position, because the shift member 81 is in an upper position as viewed in the figure, the height of the idler 70 comes to a high position, corresponding to the idler 69Ta of FIG. 13(B). In such a manner, the idler 70 selectively engages the idlers 69S and 69T. Thus, the driving is changed over between the direct and through-the-limiter modes. This changing-over is permitted to occur when the mode lever 17 is at or near the stop position. For this time, the idler 70 is separated from any of the idlers 69S and 69T. Consequently, the changing of the height of the idler 70 can be very smoothly performed.

Figure 14:
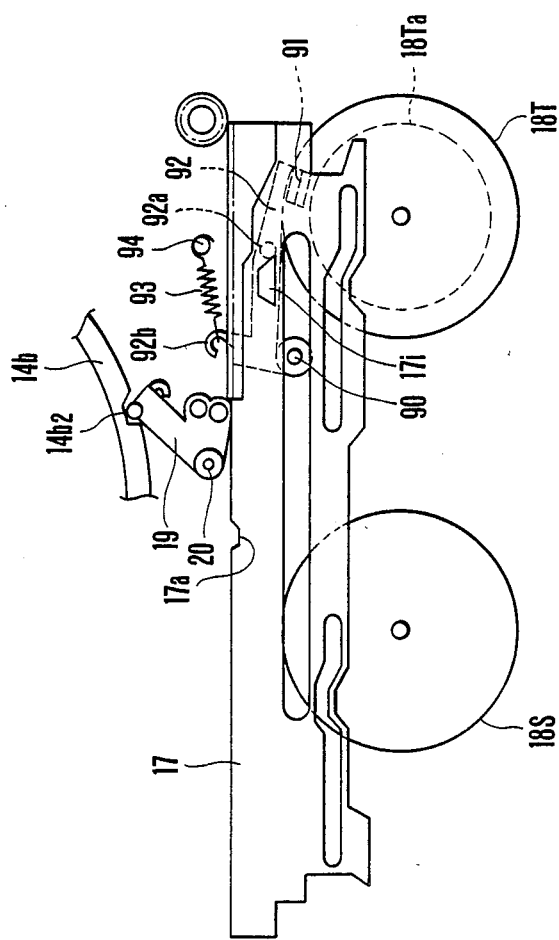
FIG. 14 is a top view taken to explain the function of a soft brake control cam.

Finally, using FIG. 14, the function of a soft brake control cam 17i is explained. FIG. 14 is a view illustrating a state when the mode lever 17 is in the reverse search position. A lever 92 is rotatable about a pin 90 and is urged in the clockwise direction by a spring 93 whose ends are connected to a hooked portion 92a and a pin 94 planted on the base plate. A pin 92a is planted on the lever 92 and abuts on the cam 17i. By the pin 92a and the cam 17i, the lever 92 is made to turn in the counterclockwise direction only when the mode lever 17 is in the play position. Hence, a soft brake pad 91 is released from the abutting engagement on the brake shoe 18Ta of the take-up reel table 18T.

This soft brake is provided for supplementing the back tension which would otherwise be insufficient when in the reverse high speed search. It is to be noted that since, when in the fast feed and rewind modes, this soft brake does not give any adverse influence, it is only in the play position of the mode lever 17 that this soft brake should be released from taking action.

Figure 15:
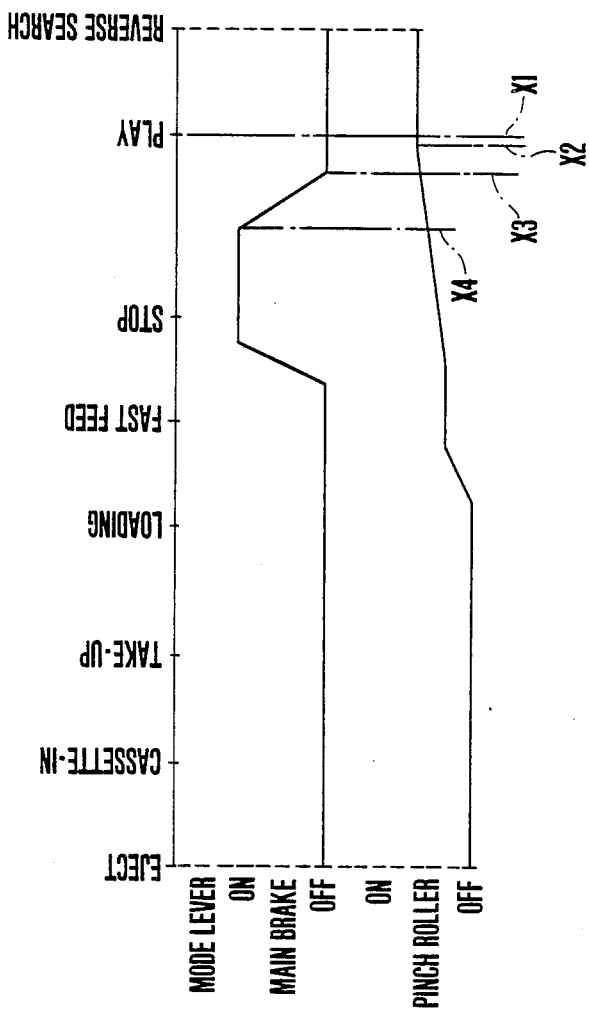
FIG. 15 is a diagram illustrating the relationship of the operation of the main brake and the pressing operation of the pinch roller onto the capstan with the position of the mode lever.

FIG. 15 is taken to explain the relationship of the operations of the main brakes 67S and 67T and the pressure-contacting operation of the pinch roller 56 on the capstan 55 with respect to the position of the mode lever 17.

Now, when the VTR is switched from the reproduction mode to the stop position, the mode lever 17 moves from the play position until the stop position. At a short distance from the play position (represented by X1 in FIG. 15) of the mode lever 17 or at a point in position (represented by X2 in FIG. 15) as slightly moved leftward from that position in FIG. 12, the release of the pinch roller 56 from the pressure contact on the capstan 55 is started. As the mode lever 17 further moves leftward as viewed in FIG. 2, when it reaches the corresponding position to a point represented by X3 in FIG. 15, the main brakes 67S and 67T start to rotate. Up to this point, the pressure under which the pinch roller 56 contacts with the capstan 55 is slightly weakened.

And, as the mode lever 17 further moves leftward in FIG. 2, when it reaches the corresponding position to a point represented by X4 in FIG. 15, the main brakes 67S and 67T can stop both reel tables 18S and 18T to the full. Meanwhile, at this time, the pressure of contact between the capstan 55 and the pinch roller 56 is lowered to such extent as to allow for slippage of the tape by the allowable tape tension. Therefore, there is no possibility of occurrence of an abnormal increase of the tape tension when both the reel tables 18S and 18T are stopped.

Also during the time until the main brakes 67S and 67T stop the reel tables 18S and 18T, the driving of the reel tables 18S and 18T and the capstan 55 continues. Thus, the tape always holds a prescribed tension.

Therefore, in the above-described embodiment of the VTR, the operation of the reproduction mode can be stopped without causing production of a slack loop of the tape, or abnormal increase of the tension in the tape. Hence, an excellent mode transition can be assured.

For note, though the foregoing has been described in connection with the transition from the reproduction state to the stopping state, the other transitions from the recording and the various special reproduction states to the stopping state can be performed by exactly the same process and with the excellent results.

In the VTR of the above-described embodiment, for the control of each mode, use is made of the mode lever 17 in combination with the slide lever 11, thereby giving an advantage that the motor 1 can be set up farther away from the mode lever than was heretofore acceptable. Particularly for a situation that, as in the embodiment of the invention, the motor 1 should also serve to drive the loading ring 14, the space has to be increased to accommodate the planetary gear unit. Moreover, the place the motor 1 is to take should be suited to drive the loading ring 14. For such a case, if the motor 1 were arranged adjacent the mode lever 17, the length of the mode lever 17 would be increased. Hence, it would be impossible to minimize the size of the apparatus. In the VTR of the invention, on the other hand, the flexibility of disposing the space the motor 1 and the planetary gear unit occupy is increased as will be understood from FIG. 2. Despite this, the size of the apparatus can be prevented from increasing in either of the vertical and lateral directions as viewed in the drawings. Further, since the control of the idler 70, the control of each of the brakes, the release of the reels from the locking connection and the pressure contact of the pinch roller 56 on the capstan are all co-ordinated by the motion of the mode lever 17, the control timing between any two of these parts can be very accurately defined.

Also, in the above-described VTR, by the pin 22 provided on the change over lever 19, when engaged in the fitted recess of the cam 17a provided in the mode lever 17, the drive load of the mode lever 17 is increased, and the mode lever is latched. This is reflected by the planetary gear unit 6–9 to drive the loading ring 14. Another feature of the cam 17a is that when the loading is complete, or when the unloading is complete, the pin 22 is allowed to get away from the inside of that recess. Thereby, the drive load of the mode lever 17 is lessened in automatic response to stoppage of the loading ring, and the planetary gear unit is operated to drive the mode lever. At this time, the pin 19a drops in the recess $14b_1$, $14b_2$ provided in the cam 14b of the loading ring 14 to increase the drive load of rotation of the loading ring 14 and latches it.

In other words, only the changeover lever 19 and the pins planted on that lever are made sufficient to carry out the changing-over of the transmission of the driving power of the motor 1 between the two paths and the selective latching of the mode lever 17 and the loading ring 14. This makes it possible to achieve a great reduction of the number of parts and saving of space. Thus, a VTR of reduced size and weight has been realized.

Further, in the VTR of the above-described embodiment, the ejection control and reel lock cams of the mode lever are made effective under the condition that the tape loading is not carried out yet. This has enabled the control of the associated mechanisms therewith to be made in desired timing. Also, the control of these is performed by the same mode lever as that of controlling the brakes and the idlers after the tape loading is complete. This makes it possible to reduce the number of parts. Further, because there is no need to use a drive mechanism solely for ejection and reel lock release, it is also made possible to reduce the weight of the VTR.

Furthermore, in the VTR of the above-described embodiment, when the mode lever 17 is in the above-described stop position, the idler 70 is made to assume the neutral position. This permits that idler 70 to be vertically movable. This allows for the height of the idler 70 to be changed independently of the control of the main brakes when the mode lever 17 comes close to the stop position. Thereby, the changing-over between when the torque limiter is operated and when not is carried out between the play and fast feed positions in a similar manner to that in which nothing more would be controlled between these positions. Therefore, it is not necessary to provide for the mode lever 17 with another stop position. This leads to shorten the total stroke of the mode lever 17. Thus, it is made possible to minimize the size of the apparatus in the longitudinal direction of the mode lever 17.

Moreover, since both reel tables 18S and 18T are held stationary by the main brakes 67S and 67T when the mode lever 17 is in the aforesaid stop position, it is desirable even from the standpoint of the relationship of the load on the tape that the idler 70 is set out of the abutting engagement on any one of the idlers 69S and 69T. On this account, what can be realized as the mode lever is given a thoroughly waste-free performance of the functions.

In the VTR of the above-described embodiment, the position the mode lever 17 takes when the pinch roller 56 is pressed against the capstan 55 is the play or reverse search positions. And, these positions are located near to each other at the left hand end of the range of movement of the mode lever 17 as viewed in the figure. Therefore, the stroke necessary to bring or take the pinch roller 56 into or out of pressure contact on the capstan 55 has to be exerted only when the mode lever 17 moves between the stop and play positions. This produces an advantage in that the total stroke of the mode lever 17 can be maintained at a minimum.

Further, since, in the above-described embodiment, even when the mode lever 17 is in the stop and fast feed positions, the pinch roller 56 and the capstan 55 are arranged to lie as near to each other as possible, the distance between the stop and play position becomes relatively short. This also contributes to a decrease of the total stroke of the mode lever 17.

What is claimed is:

1. A rotary head type recording and/or reproducing apparatus comprising:
   (a) a cylinder member having a rotary head;
   (b) tape loading means for winding a tape-shaped recording medium stretched between a pair of reels onto said cylinder member, said loading means having a movable guide post for guiding said tape-shaped recording medium;
   (c) transportation means for transporting said tape-shaped recording medium and having a plurality of modes;
   (d) a motor;
   (e) a mode lever having a plurality of cams and slidable between a plurality of stop positions;
   (f) mode control means for changing a mode of said transportation means to one of said plurality of modes depending upon the stop position of said mode lever; and
   (g) transmitting means for transmitting a driving force of said motor to said tape loading means and said mode lever, said transmitting means including a first rotary gear which is rotated by the driving force produced by said motor, a plurality of revolving gears which are in meshing engagement with said first rotary gear and are revolvable around said first rotary gear, while each of them is rotatable around its rotating axis, a second rotary gear which is rotatable coaxially with said first rotary gear and pivotally supports said plurality of revolving gears and a third rotary gear which is rotatable coaxially with said first rotary gear and is in meshing engagement with said plurality of revolving gears, wherein said driving force is transmitter through said second rotary gear to one of said guide post and said mode lever and through said third rotary gear to the other of said guide post and said mode lever.

2. An apparatus according to claim 1, wherein said transmitting means further includes change-over means for changing over the relative amount of the driving load of said guide post and the driving load of said mode lever.

3. An apparatus according to claim 2, wherein said change-over means includes a change-over member for selectively latching said guide post and said mode layer.

4. An apparatus according to claim 3, wherein said change-over member is arranged to be rotatable and includes a first pin engageable in a recess of said mode lever at one end of rotation of said change-over means and a second pin engageable in a recess of said guide post at the other end thereof.

5. An apparatus according to claim 1, wherein said transportation means includes reel driving means for driving said pair of reels, braking means for braking the respective rotations of said pair of reels, and tape driving means for directly driving the tape-shaped recording medium stretched between said pair of reels, said mode control means being arranged to change over states of said reel driving means, said braking means and said tape driving means, depending upon the stop positions of said mode lever.

6. A rotary heat type recording and/or reproducing apparatus, comprising:
   (a) a cylinder member having a rotary head;
   (b) tape loading means for winding a tape-shaped recording medium stretched between a pair of reels onto said cylinder member, said tape loading means includes a movable guide post for guiding said tape-shaped recording medium and guide post moving means movable between a first position where said tape-shaped recording medium is in contact with said cylinder member and a second position where the recording medium is not in contact with the cylinder member;
   (c) transportation means for transporting said tape-shaped recording medium and having a plurality of modes;
   (d) a motor;
   (e) a mode lever having a plurality of cams and slidable between a plurality of stop positions;
   (f) mode control means for changing a mode of said transportation means to one of said plurality of modes, depending upon the stop position of said mode lever; and
   (g) transmitting means for selectively transmitting a driving force produced by said motor to said tape loading means and said mode lever, said transmitting means being arranged to transmit the driving force produced by said motor to said mode lever when said guide post is located at said first position and said second position and to transmit the driving force produced by said motor to said tape loading means when said guide post is located at a position between said first position and said second position.

7. An apparatus according to claim 6, wherein said transmission means is arranged to lock said guide post when said guide post is located between said first position and said second position and including locking means for locking said mode lever when said guide post is located at said first position and said second position.

8. An apparatus according to claim 7, wherein said locking means includes a first pin arranged to engage in a recess of said mode lever when said guide post is located at a position between said first position and said second position and a second pin arranged to engage in a recess of said guide post when said guide post is located at said first position and said second position.

9. An apparatus according to claim 6, wherein said plurality of stop positions of said mode lever includes two or more first stop positions, two or more second stop positions and said second position, wherein said guide post is located at said first positions when said mode lever is located at said first stop positions and said guide post is located at said second position when said mode lever is located at said second stop positions.

10. An apparatus according to claim 9, wherein said transmitting means includes reel driving means for driving said pair of reels, braking means for braking the respective rotations of said pair of reels, and tape driving means for directly driving the tape-shaped recording medium stretched between said pair of reels, said mode control means being arranged to change over states of said reel driving means, said braking means and said tape driving means, depending upon the stop position of said mode lever.

11. A rotary head type recording and/or reproducing apparatus comprising:
  (a) a cylinder member having a rotary head;
  (b) tape loading means for winding a tape-shaped recording medium stretched between a pair of reels onto said cylinder member;
  (c) transportation means for transporting said tape-shaped recording medium, said transportation means including reel driving means for driving said pair of reels, braking means for braking the respective rotations of said pair of reels and tape driving means for directly driving the tape-shaped recording medium stretched between said pair of reels;
  (d) a motor;
  (e) a mode lever having a plurality of cams and slidable between a plurality of stop positions, said plurality of stop positions including two or more first stop positions, two or more second stop positions and a third stop position disposed between said first stop positions and said second stop positions;
  (f) transmitting means for transmitting a driving force produced by said motor to said tape loading means and said mode lever; and
  (g) mode control means for changing over modes of said transportation means and said transmitting means among a plurality of modes, depending upon the stop position of said mode lever, said mode control means being arranged to control the mode so that said transmitting means feeds the driving force produced by said motor to said tape loading means only when said mode lever is located at said third stop position.

12. An apparatus according to claim 11, wherein said transportation means includes reel driving means for driving said pair of reels, braking means for braking the respective rotations of said pair of reels, and tape driving means for directly driving the tape-shaped recording medium stretched between said pair of reels, said mode control means being arranged to change over states of said reel driving means, said braking means and said tape driving means, depending upon the stop positions of said mode lever.

13. A rotary head type recording and/or reproducing apparatus comprising:
  (a) a cylinder member having a rotary head;
  (b) tape loading means for winding a tape-shaped recording medium stretched between a pair of reels onto said cylinder member;
  (c) transportation means for transporting said tape-shaped recording medium; said transportation means having a plurality of modes and including reel driving means for driving said pair of reels, braking means for braking the respective rotations of said pair of reels and tape driving means for directly driving the tape-shaped recording medium stretched between said pair of reels;
  (d) a motor;
  (e) a mode lever having a plurality of cams and slidable between a plurality of stop positions, said plurality of stop positions including two or more first stop positions and two or more second stop positions, first stop positions being disposed in adjacent relation with each other in the sliding direction of said mode lever;
  (f) transmitting means for transmitting a driving force produced by said motor to said tape loading means and said mode lever; and
  (g) mode control means for changing over a mode of said transportation means to one of said plurality modes depending upon the stop position of said mode lever, said mode control means being arranged to allow operation of said tape driving means only when mode lever is located at said first stop positions.

14. An apparatus according to claim 13, wherein said tape driving means includes a capstan and a pinch roller which is arranged to cooperate with said capstan to hold said tape-shaped recording medium therebetween and to drive said medium.

* * * * *